(12) United States Patent
Donati

(10) Patent No.: US 11,473,964 B1
(45) Date of Patent: Oct. 18, 2022

(54) TRUCK TOUGH SCALE

(71) Applicant: Carl Emil Donati, Butler, PA (US)

(72) Inventor: Carl Emil Donati, Butler, PA (US)

(*) Notice: Subject to any disclaimer, the term of this patent is extended or adjusted under 35 U.S.C. 154(b) by 146 days.

(21) Appl. No.: 17/060,741

(22) Filed: Oct. 1, 2020

Related U.S. Application Data

(60) Provisional application No. 62/961,344, filed on Jan. 15, 2020, provisional application No. 62/973,518, filed on Oct. 9, 2019.

(51) Int. Cl.
| | |
|---|---|
| *G01G 19/08* | (2006.01) |
| *G01G 23/36* | (2006.01) |
| *G01G 21/28* | (2006.01) |
| *G01G 21/02* | (2006.01) |
| *B62D 21/02* | (2006.01) |
| *B60R 16/03* | (2006.01) |
| *B60K 35/00* | (2006.01) |
| *B62D 33/02* | (2006.01) |
| *B60R 16/033* | (2006.01) |

(52) U.S. Cl.
CPC ............ *G01G 19/08* (2013.01); *B60K 35/00* (2013.01); *B60R 16/033* (2013.01); *B62D 21/02* (2013.01); *B62D 33/02* (2013.01); *G01G 21/28* (2013.01); *G01G 23/36* (2013.01); *B60K 2370/152* (2019.05); *B60K 2370/167* (2019.05); *B60K 2370/44* (2019.05)

(58) Field of Classification Search
CPC ........ G01G 19/08; G01G 21/28; G01G 23/36; B60K 35/00; B60K 2370/44; B60K 2370/152167; B60R 16/033; B62D 21/02
See application file for complete search history.

(56) References Cited

U.S. PATENT DOCUMENTS

| | | | | |
|---|---|---|---|---|
| 4,852,674 A | * | 8/1989 | Gudat | G01G 19/10 177/DIG. 10 |
| 4,905,780 A | * | 3/1990 | Goff, III | G01G 17/08 177/136 |
| 5,167,289 A | * | 12/1992 | Stevenson | G01G 5/04 177/209 |
| 5,172,781 A | * | 12/1992 | Hlavinka | G01G 19/445 177/144 |
| 6,396,003 B1 | * | 5/2002 | Friesen | G01G 19/08 177/136 |
| 9,631,969 B1 | * | 4/2017 | Whalen | G01G 19/02 |

(Continued)

*Primary Examiner* — Randy W Gibson
(74) *Attorney, Agent, or Firm* — Karen Tang-Wai Sutton

(57) ABSTRACT

A truck scale assembly comprised of a payload containment portion affixed to a frame, an array of load cell assemblies, and a display screen positioned on a pickup truck surface. The array features load cell assemblies arranged in spaced apart relationship along an underside of the payload containment portion to allow load information from various regions of the containment portion to be communicated to and visually displayed by the display screen, allowing a truck operator to understand payload weight and relative distribution in the payload containment portion of the pickup truck. One embodiment of the assembly is an aftermarket drop in liner installed in an existing truck bed assembly, and a second embodiment is factory installed, with the array sandwiched between an underside of the truck bed and the truck frame. Information from the array is transmitted by wired connection or wirelessly to the display screen.

3 Claims, 12 Drawing Sheets

(56) References Cited

U.S. PATENT DOCUMENTS

| | | | | |
|---|---|---|---|---|
| 10,990,822 | B2* | 4/2021 | Rogness | G06K 9/6288 |
| 11,247,691 | B2* | 2/2022 | Almahmoud | B60W 40/13 |
| 2012/0318791 | A1* | 12/2012 | Roman | B65F 1/1615 |
| | | | | 220/23.9 |
| 2018/0216989 | A1* | 8/2018 | Servin | G01G 19/56 |
| 2019/0100379 | A1* | 4/2019 | Hatayan | G01G 19/12 |
| 2021/0048334 | A1* | 2/2021 | Salter | G01G 23/36 |

\* cited by examiner

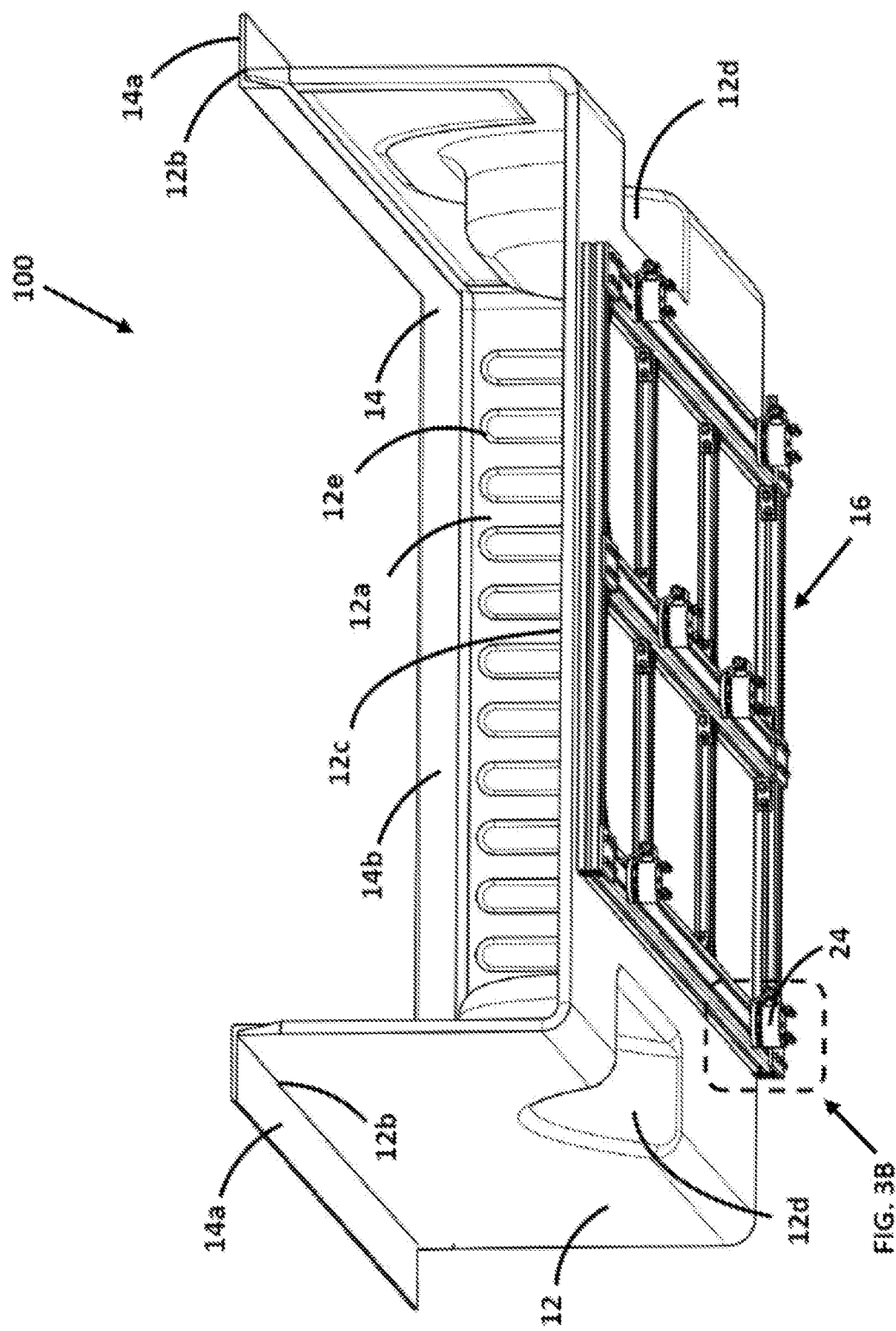

TRUCK TOUGH SCALE

CROSS-REFERENCE TO RELATED APPLICATIONS

Reference is made to and priority claimed from U.S. Provisional application No. 62/973,518 filed 9 Oct. 2019 for a Truck Tough Scale, and U.S. Provisional application No. 62/961,344 filed 15 Jan. 2020 for a Tough Truck Scale, whose disclosures are herein incorporated in their entirety by reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The present invention pertains to the field of truck bed accessories. Specifically, the invention is a scale incorporated into a truck bed so as to allow a load positioned inside the truck bed to be weighed and the weight of the load visually displayed.

Background Art

Trucks are the ultimate utility vehicle. Pickup trucks of varying horsepower and torque are used to haul an assortment of equipment, trailers, and miscellaneous landscape and construction supplies, including dense, heavy supplies such as gravel and bricks. The majority of pickup trucks have a truck bed payload capacity between 1600-3600 lbs, and every truck operator knows the maximum payload the truck can safely carry. Despite this knowledge, it is nevertheless difficult to assess whether the maximum payload has been reached as the total payload must be guessed and this guesswork is typically done visually and arbitrarily. One clue is looking at the bed and whether the back of the truck is sagging or lower. Another is to drive the truck and see if it is more difficult to handle and steer. Since exceeding payload can cause lasting damage to the truck's suspension and shocks, and even result in tire failure and accidents, most truck owners err on the side of caution and prefer to make extra trips rather than potentially damage the truck. However, this guesswork often means extra unnecessary trips are taken, wasting time and money. Unfortunately, there is a large percentage of truck owners who, believing "it's a truck, trucks are tough," cause irreversible harm to the drivability and suspension of their trucks by overloading the beds.

Currently, the only way a truck's payload can be measured is by driving the empty truck onto a scale and then reweighing after the truck is loaded to determine the payload. Every truck driver who has gone to a supply yard to purchase stone has done this, and it is relatively easy when there is a ready existing scale upon which to drive. However, what of the truck operator hauling large logs from his farm? Or broken concrete from his basement remodel job? There is no easy way to accurately weigh these kinds of payloads.

What is needed is a scale incorporated into the truck bed with a payload manager system that provides visual weight information, available as a removable aftermarket truck bed liner installed onto an existing truck, and additionally as an integral truck bed scale built into a new or existing truck.

DISCLOSURE OF INVENTION

A truck scale assembly for weighing a payload supported by a truck bed is comprised of a payload containment portion with a planar payload support surface with side walls, an array of load cell assemblies, a scale frame supporting the array and the payload containment portion, a display screen in communication with the array displaying payload information, and one or more power sources supplying power to the display screen and to the array. An aftermarket, drop in embodiment has a hollow box frame as the scale frame and a scale bed mold as the payload containment portion. An integral embodiment uses an existing frame of the truck as the scale frame, and the existing truck bed assembly as the payload containment portion.

For either embodiment, the payload support surface has a corrugated surface having alternating peaks and grooves. The array is comprised of at least two load cell assemblies positioned inside at least one of the peaks and grooves of the corrugated surface.

For the aftermarket, drop in embodiment, the scale frame is comprised of a pair of back to back c-channels with at least two longitudinal members and at least two cross members wherein the longitudinal members and cross members are at least one of adjustably affixed and permanently welded together to form the scale frame and where the array is affixed to the scale frame c-channel by at least one T-shaped fastener slideably positioned inside the c-channel.

Suitable load cell assemblies are pancake-style assemblies, having a maximum load capacity of about 500 pounds, with the load cell assemblies typically in spaced apart relationship in the array.

Each load cell assembly of the array communicates load information independently to the display screen, and the display screen shows information from each load cell assembly of the array as a visual graphic allowing visual comparison and understanding of each load cell assembly's positional and load information in the truck bed. Load cell assembly information is communicated to the display screen using at least one of a wired connection and a wireless connection.

The display screen is at least one of an integrated display screen built into the truck, or a mobile screen mounted permanently or movably to the truck. The display screen may also comprise a speaker providing auditory signaling when the total payload is approaching maximum capacity.

The truck scale assembly, in yet another embodiment, may be configured as an aftermarket kit having a plastic corrugated scale bed mold having a bed portion and at least one side wall, the side wall having a tapered uppermost edge, a sealing lip fitting over the tapered uppermost edge of the side wall, a scale frame affixed to the underside of the scale bed mold to which an array of load cell assemblies are affixed, and a display screen. The plastic corrugated bed mold is sized and shaped to fix inside an existing truck bed assembly while maintaining a spaced apart relationship between the side wall of the plastic corrugated bed mold and the existing truck bed wall of less than 2 inches. The array is arranged on the scale frame to as to fit inside the corrugations of the existing truck bed and the bed mold. The array communicates load information of each individual load cell assembly to the display screen using at least one of a wired connection and a wireless connection.

BRIEF DESCRIPTION OF THE DRAWINGS

The features and advantages of the invention will become apparent from a consideration of the subsequent detailed description presented in connection with accompanying drawings, in which:

FIG. 3A is a perspective view of the bottom of the truck scale in FIG. 1A.

DRAWINGS LIST OF REFERENCE NUMERALS

Figure 1A:
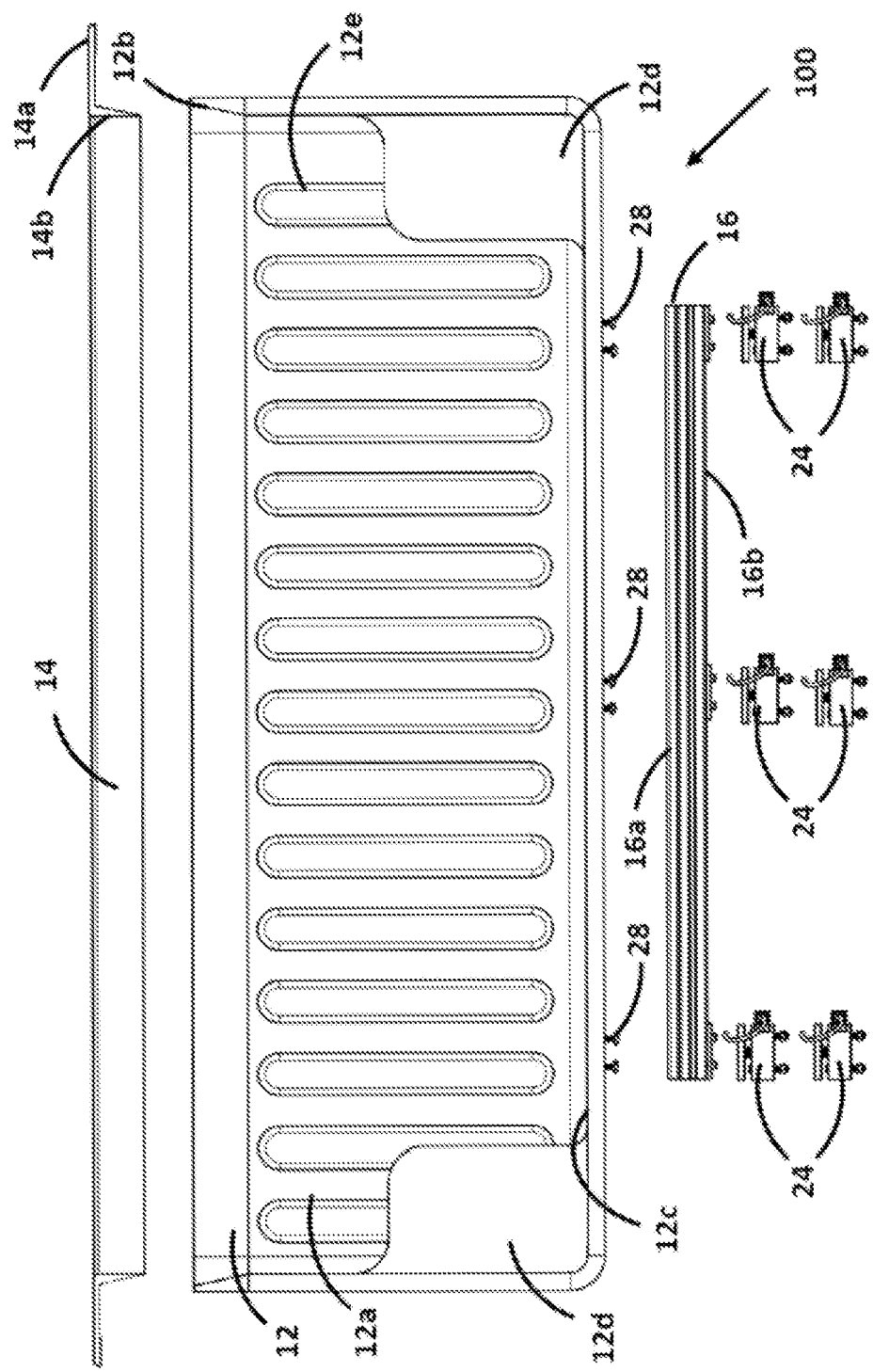
FIG. 1A is an exploded front view of a first embodiment or aftermarket truck scale according to the invention, shown as an aftermarket embodiment.
Figure 1B:
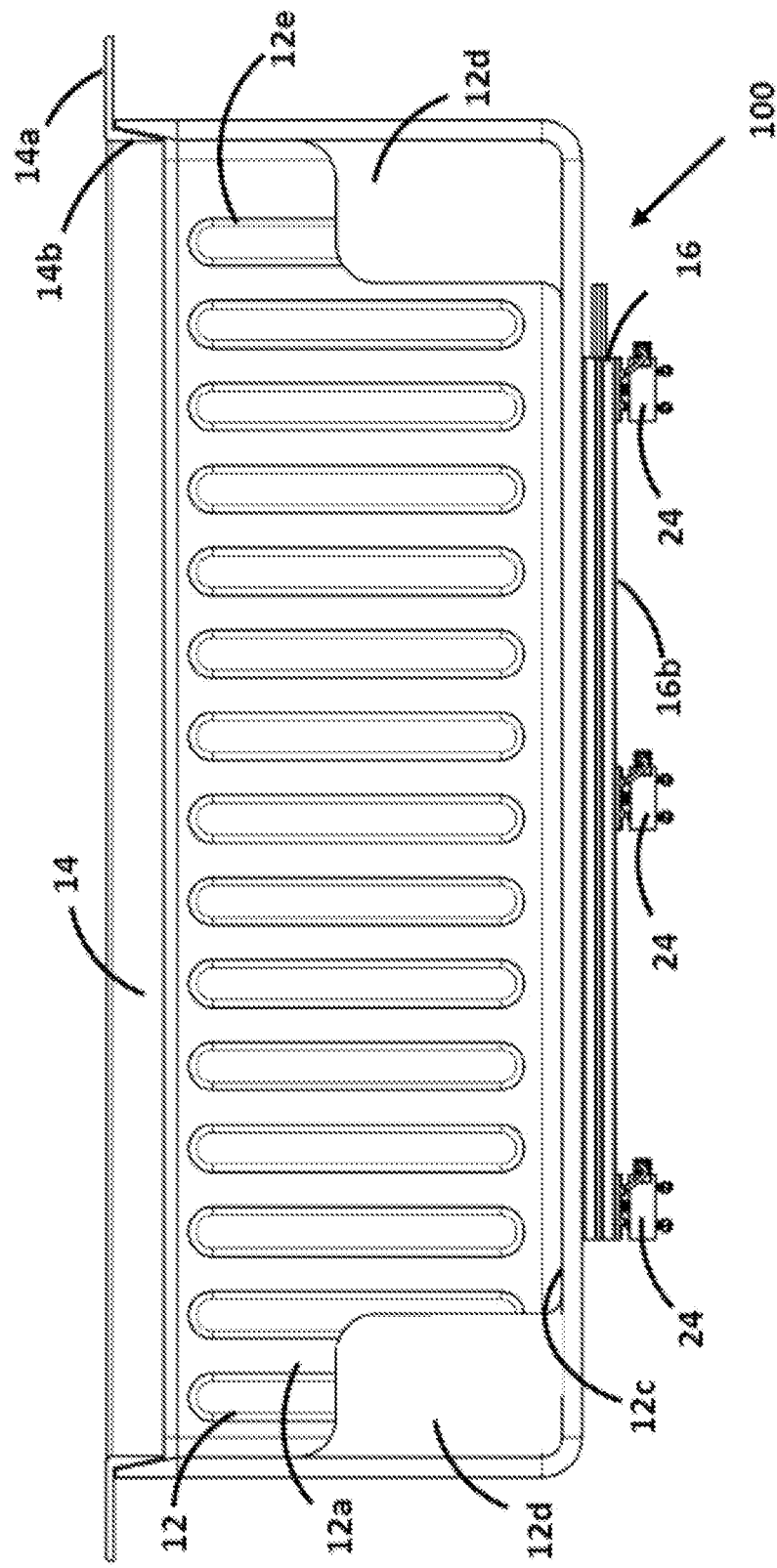
FIG. 1B is a front view of the truck scale in FIG. 1A.

The following is a list of reference labels used in the drawings to label components of different embodiments of the invention, and the names of the indicated components.
100 truck scale assembly
12 truck scale bed mold or bed mold
12a side wall of scale bed mold or side wall
12b uppermost edge
12c bed portion
12d wheel well bump out
12e corrugated surface
14 mold sealing lip
14a flange
14b vertical leg
16 scale frame
16a upper C-shaped channel or upper c-channel
16b lower C-shaped channel or lower c-channel
16c main member
16d inner cross member
16e outermost cross member
22c RGA through-holes
18 aperture (in frame)
20 reinforcement plate assembly or RPA
20a RPA plate
20b RPA fastener
22 reinforcement gusset assembly or RGA
22a RGA gusset
22b RGA fastener
24 load cell assembly
24a load cell upper section
24b load cell lower section
24c load cell heavy duty threaded shaft
24d load cell threaded hole
24e load cell data port
24f load cell data cable
28 fasteners, including T-nuts, T-bolts, bolts, screws
30 truck
32 existing truck bed assembly or truck bed assembly or bed assembly
32a existing truck bed top edge or rim
32b existing truck bed or bed
32c wheel well bump out
32d side wall of bed assembly
34 truck frame
36 display screen
38 load indicator symbols

DETAILED DESCRIPTION

A truck scale and display screen assembly according to the invention 100 is shown in FIGS. 1A-7B in two embodiments. Both embodiments feature a corrugated, planar payload support surface that is approximately rectangular, and a side wall or side walls rising upwards from the support surface along three sides, with a hinged or otherwise removable forth side to allow side access to the support surface. The inventor notes that the side wall can be configured or described as a single continuous side wall, or as two or more separate side walls that are then joined to form two or more side walls, and references in this disclosure to "side wall" or "side walls" when referring to the invention are in fact referring to a same structure, namely walls that rise upwards from the support surface. The payload support surface is further supported by an attached frame and an array of load cell assemblies 24 in communication with a display screen 36. The assembly 100 is shown in the Figures in an aftermarket, removable embodiment, as well as in an OEM or original equipment manufacturer embodiment that is factory installed into the truck 30.

Turning to FIGS. 1A-5, in a first embodiment, an aftermarket truck scale and load manager assembly 100 is comprised of the planar payload support surface and side walls configured as a scale mold or bed mold 12 sized and shaped to insert into an existing truck bed assembly 32. The existing truck bed assembly 32 includes a truck bed 32b, which is the planar payload support surface, the approximately perpendicular side walls 32d rising vertically from the truck bed 32b, and a pair of wheel well bump outs 32c that protrude into the truck bed 32b area to accommodate a pair of wheels of the truck 30. A hinged truck tailgate that swings open to allow access to the truck bed 32b, is not shown in the Figures but is also a part of the existing truck bed assembly 32 and is not shown in the Figures to allow better visual understanding of the invention 100.

The bed mold 12 in the Figures is a drop in truck bed liner with a planar bed portion 12c with curved wheel well bump out portions 12d, and with vertical side walls 12a continuous with the bed portion 12c extending to just below a top edge or rim 32a of the existing truck bed assembly 32. The side walls 12a are tapered at their uppermost ends. The side walls 12a discontinue at a tailgate portion of the truck bed assembly 32 (not shown) to allow the tailgate to open and close for easy access to the truck bed. A separate liner panel (not shown) is affixed to an inner side of the tailgate. The bed mold 12 has a corrugated surface 12e along the bed portion 12c and the side walls 12a, with the corrugated surface 12e corresponding to a corrugated surface of the truck bed 32, and is made of heavy duty plastic capable of withstanding rough and heavy payloads as well as weathering and UV exposure.

A mold sealing lip 14 is L-shaped, having a vertical leg 14b with a tapered lowermost end and an opposed uppermost end formed as an outwardly extending flange 14a perpendicular to the vertical leg 14b. The tapered lowermost end of the mold sealing lip 14 mates with a correspondingly tapered uppermost edge 12b of the side walls 12a of the bed mold 12. The flange 14a is sized and shaped to fit over the rim 32a of the truck bed assembly 32, with the tapered ends of the vertical leg 14b and the side walls 12a sized and shaped so as to be in slideable relationship, allowing the scale bed mold 12 to move smoothly up and down along the tapered vertical leg 14b of the mold sealing lip 14. The mold sealing lip 14 seals the bed mold 12 to the existing truck bed assembly 32 against water and particulate intrusion, and positions the bed mold 12 to fit relatively closely inside the existing truck bed assembly 32 but in spaced apart relationship with the sides and bed of the existing assembly 32. The spaced apart relationship of the bed mold 12 and the existing truck bed assembly 32 is important for accuracy of measured payload weight. The inventor notes that the spacing is ideally less than a quarter inch gap to maintain maximum bed mold capacity, however the size of the spacing can be over an inch or any other desired gap size.

The bed mold 12 is affixed to a scale frame 16. The scale frame 16 shown in the Figures is comprised of a pair of parallel, mirror image c-shaped channels or c-channels formed back to back such that there is an upper c-channel 16a facing upwards and a lower c-channel 16b facing downwards. The c-channels 16a 16b are sized and shaped to receive a plurality of fasteners 28, typically T-shaped threaded nuts or other fasteners that slide horizontally into the c-channels 16a 16b to allow adjustment for fastening the bed mold 12 to the scale frame 16 as well as to the position of the array of load cell assemblies 24. The scale frame 16 may also however be a single c-channel with a flattened side opposed the open side, with either the c-channel or the flattened side facing upwards or downwards, as desired, and with a series of apertures 18 formed into the flattened side to allow fastening. Alternatively, the scale frame 16 could also be made so as to be non-adjustable, and have a hollow box-profile with the appropriate apertures 18 for use with a desired fastener such as bolts, screws or other appropriate fasteners.

Figure 2:
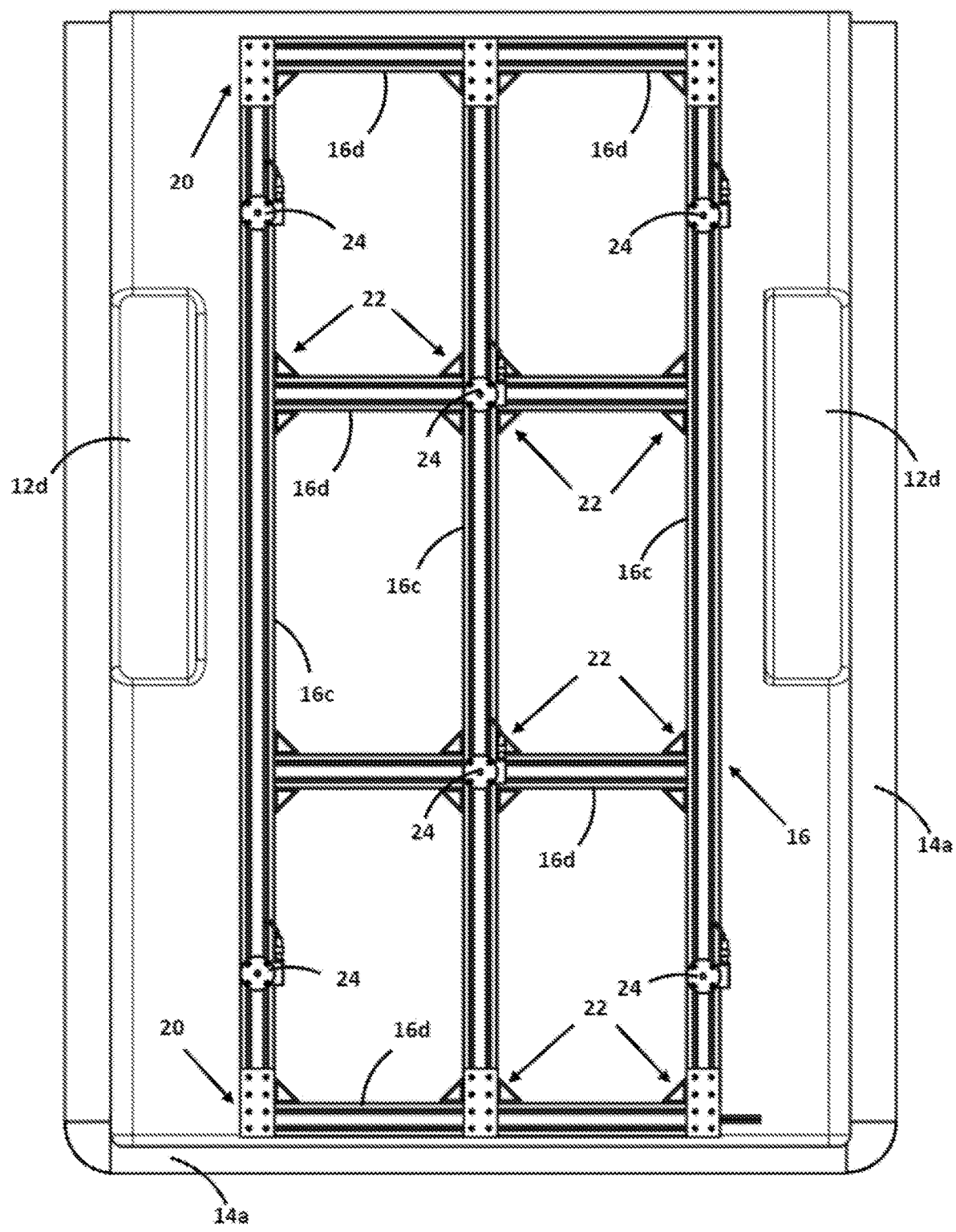
FIG. 2 is a bottom view of the truck scale in FIG. 1A.
Figure 3B:
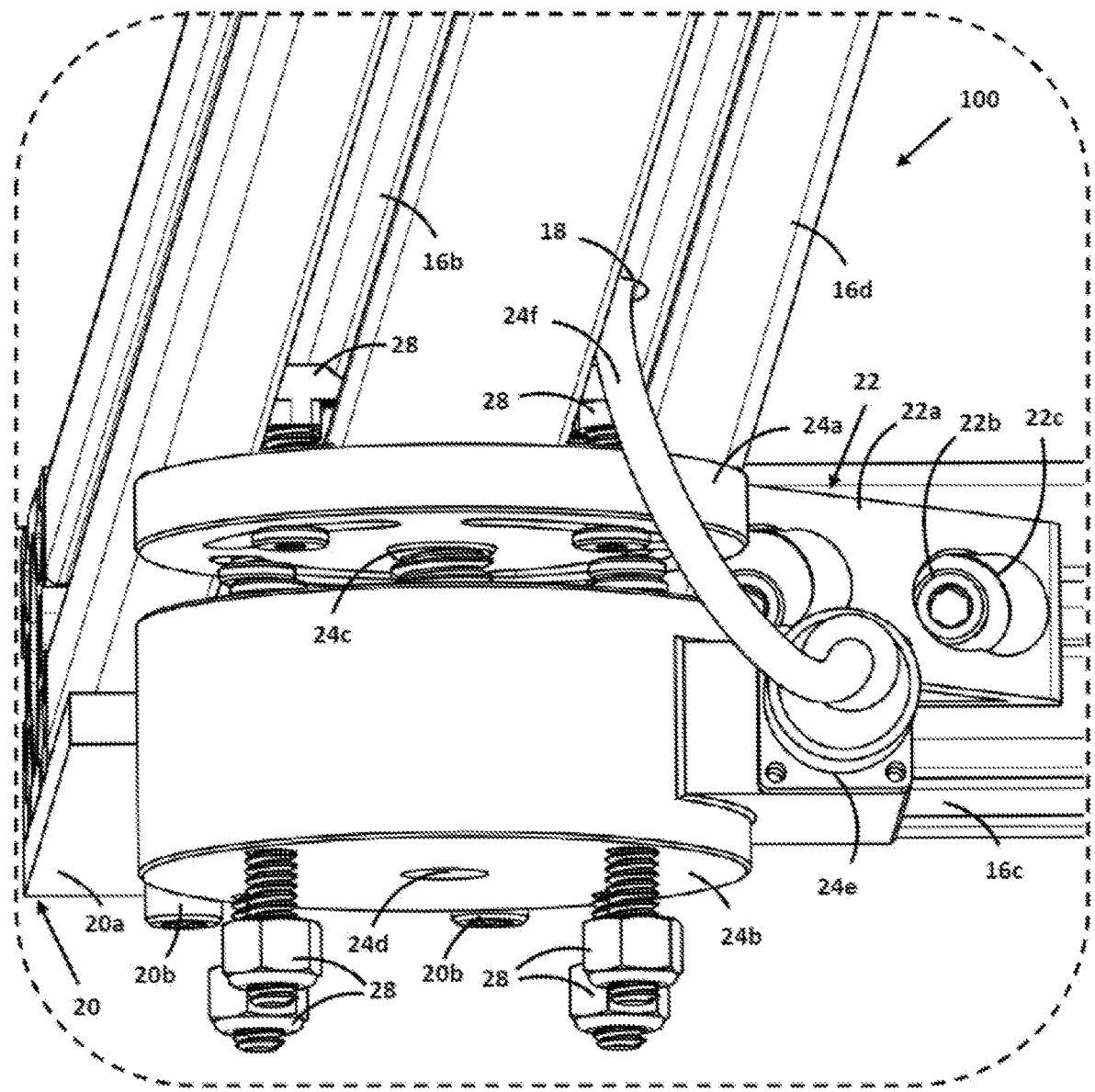
FIG. 3B is a detail view of a load cell assembly and modularity.
Figure 4A:
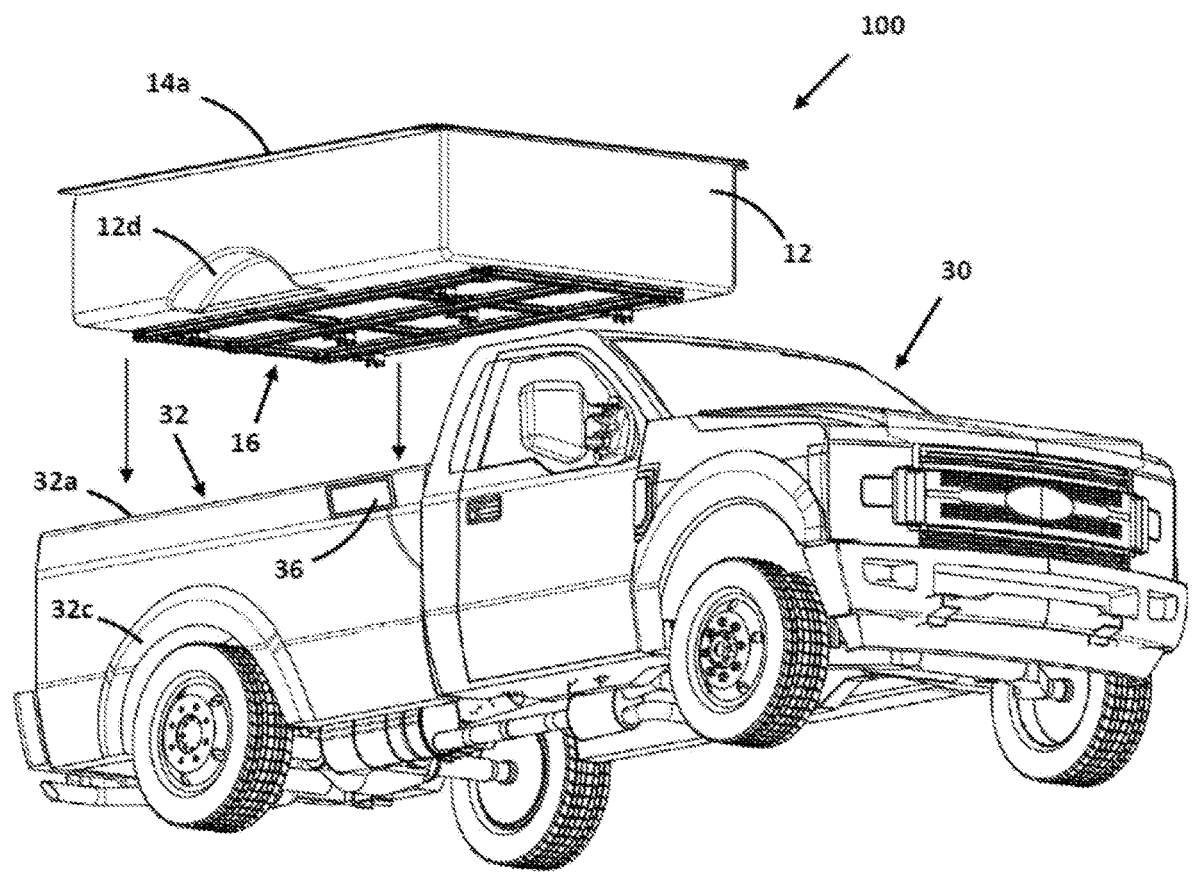
FIG. 4A is a perspective view of the aftermarket truck scale in a partial exploded view with a truck.
Figure 4B:
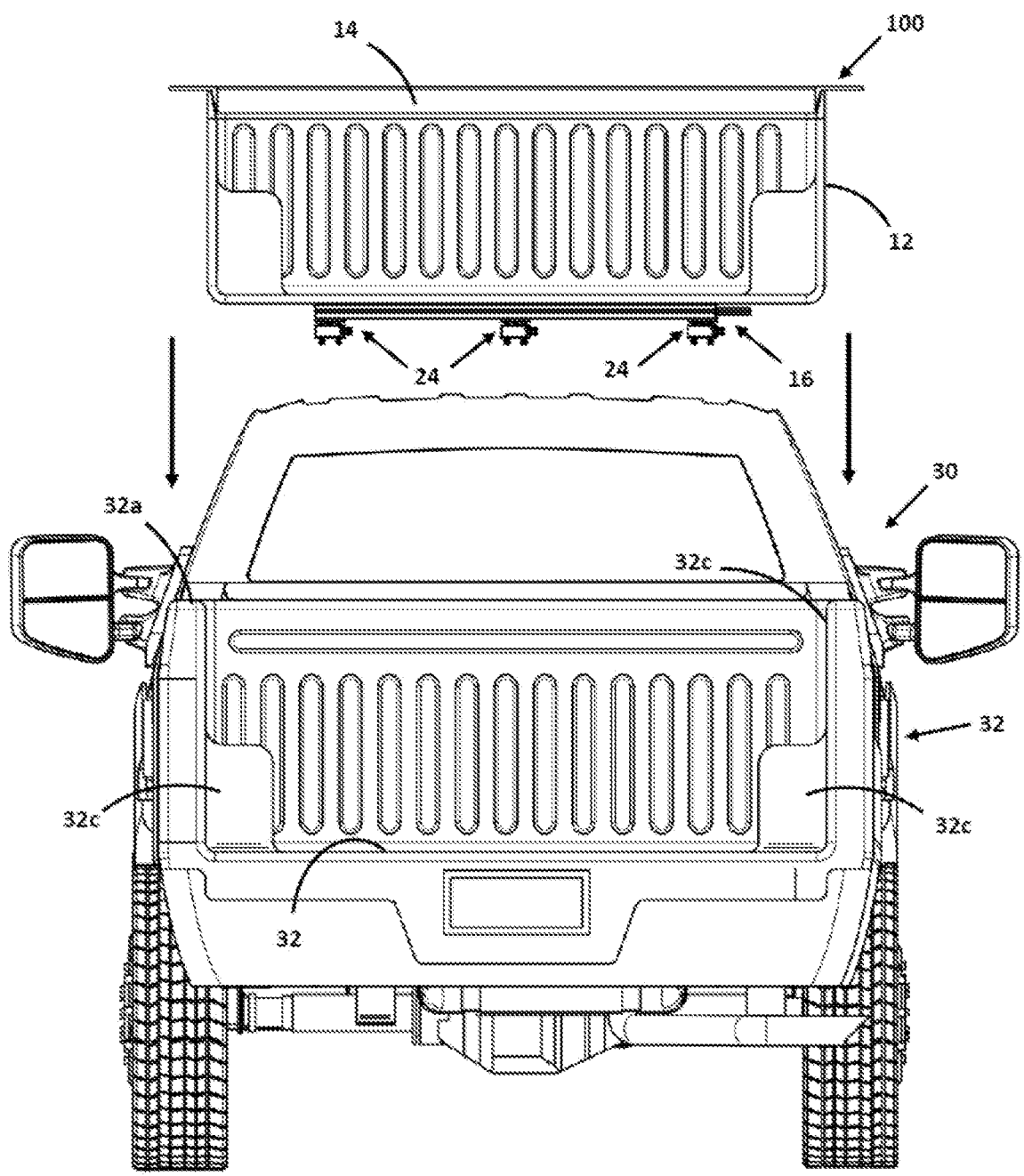
FIG. 4B is a back view of the aftermarket truck scale and truck shown in FIG. 4A.
Figure 5:
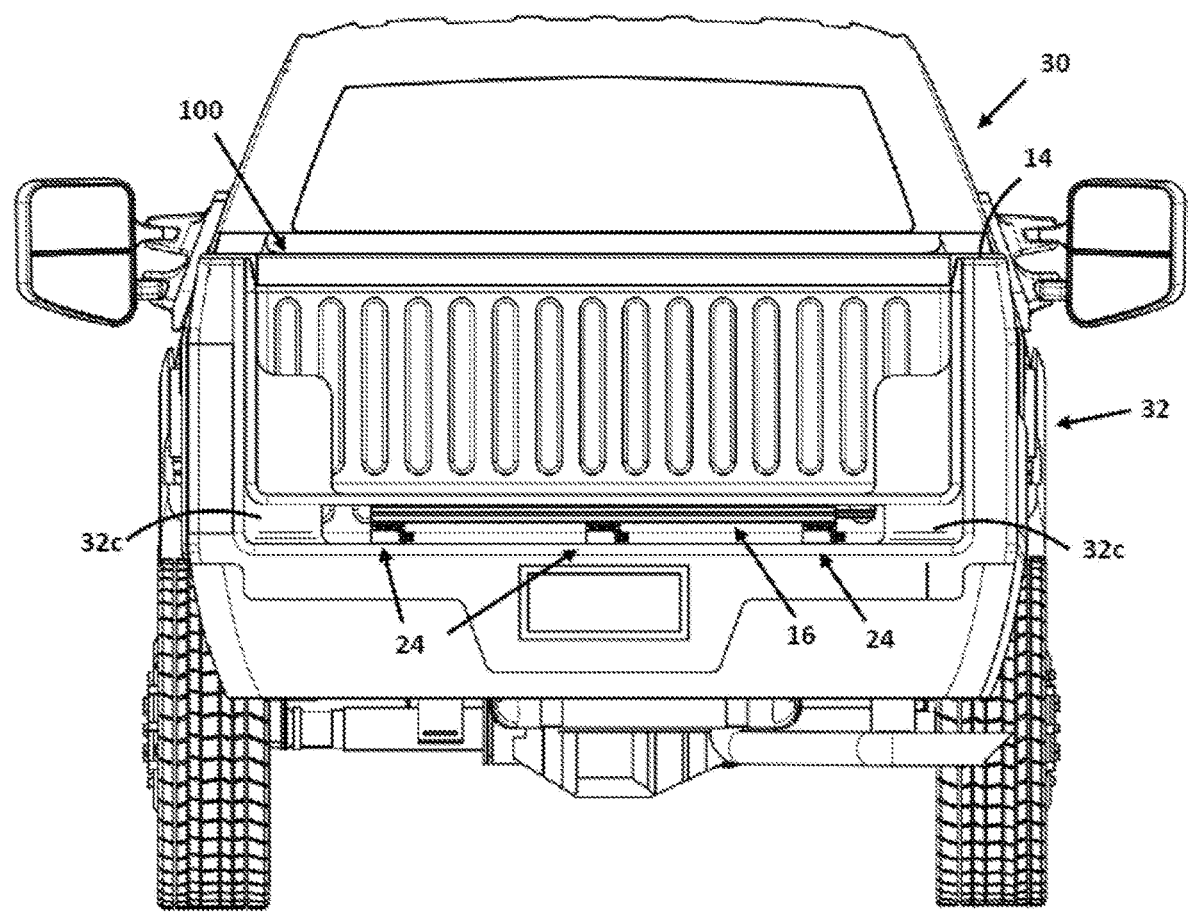
FIG. 5 is a back view of the aftermarket truck scale installed in a bed of the truck in FIG. 4B.
Figure 6A:
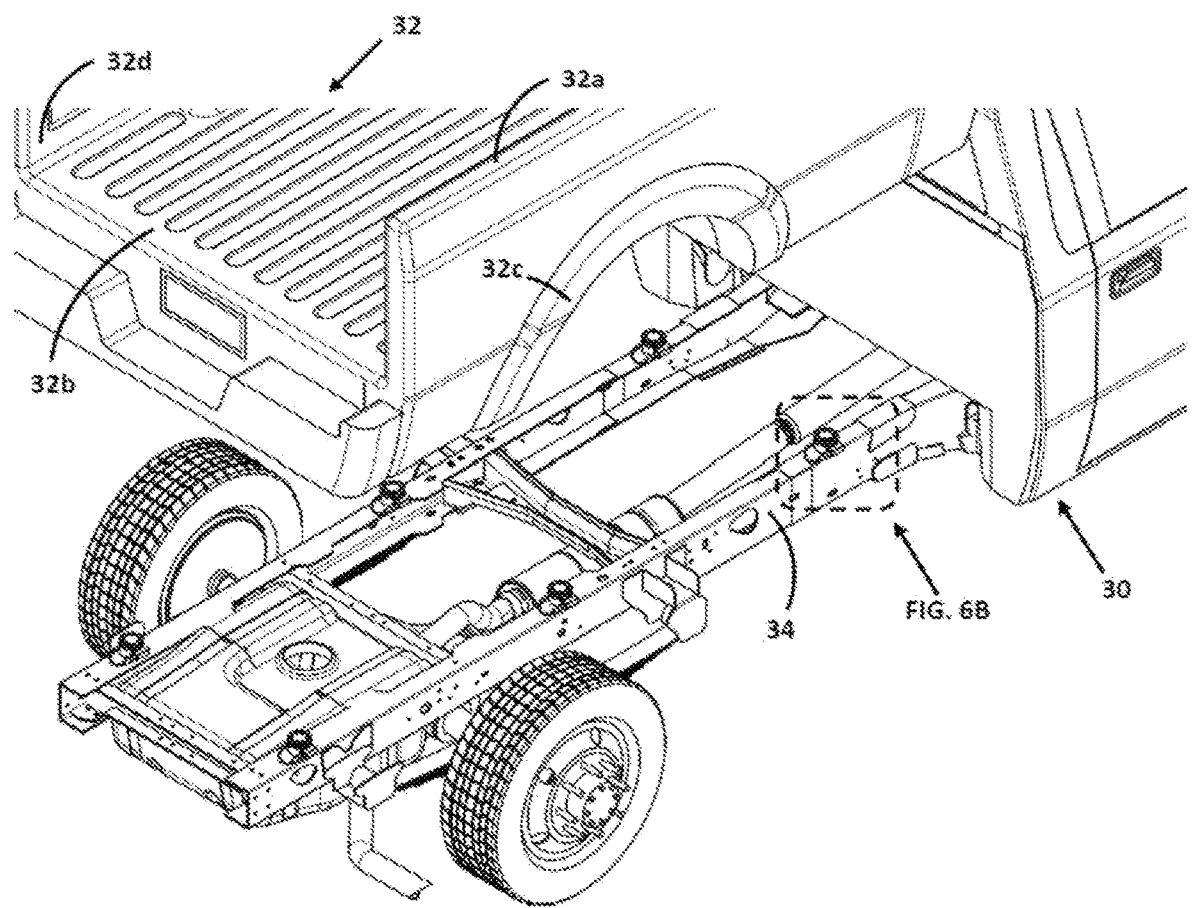
FIG. 6A is a perspective view of a second embodiment, or factory installed truck scale installed on a frame of the truck.
Figure 6B:
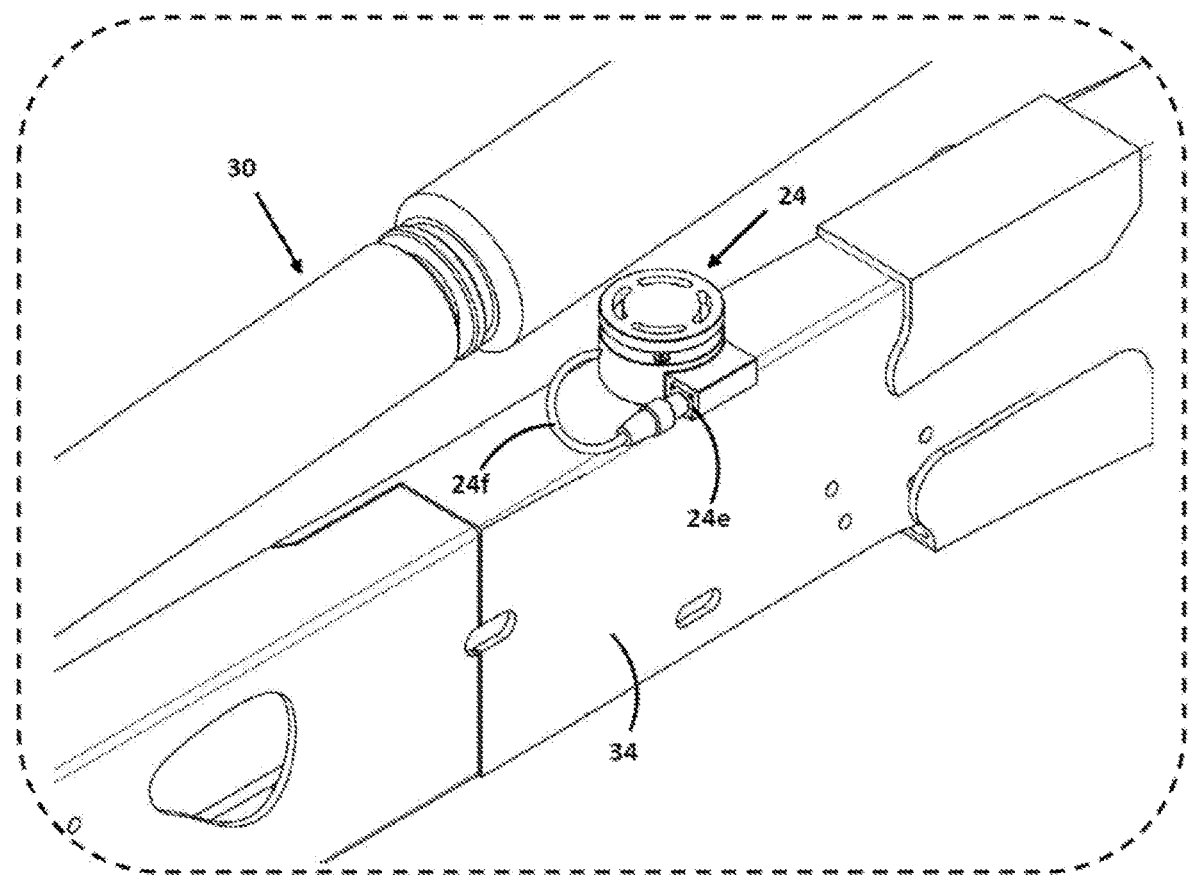
FIG. 6B is a detail view of the load cell assembly affixed to the frame of the truck.

Looking at FIG. 2, in the embodiment of the scale frame 16 shown, the scale frame 16 is an approximately rectangular structure comprised of three main members 16c in parallel, spaced apart relationship affixed to a pair of outermost cross members 16e and four additional innermost cross members 16d, all cross members 16d 16e perpendicular to the three main members 16c so as to create the rectangular scale frame. Six reinforcement plate assemblies or RPA 20, each RPA 20 comprised of an RPA plate 20a and a plurality of RPA fasteners 20b reinforce each connection junction of a pair of outermost cross members 16e to the three main members 16c. Additionally, reinforcement gusset assemblies or RGA 22, each RGA comprised of an RGA gusset structure 22a and at a pair of RGA fasteners 22b inserted into RGA through-holes 22c, are used to connect each main member 16c to its innermost cross member 16d. As previously noted, the scale frame 16 may be configured in a variety of ways so as to be adjustable as in the aftermarket drop in embodiment shown in FIG. 2, or non-adjustable, by welding the members 16d 16e together, hence the embodiment shown in the Figures is not meant to limit the scale frame 16 to what is shown, but to give an example of a suitable scale frame. Many other types of frames may be created, adjustable and non-adjustable, that are nevertheless suitable. Typically, if the scale frame 16 is to be adjustable, it is a hollow extrusion with various adjustable sections, and as previously described, reinforced with structures such as the RPA 20 and RGA 22 as needed, noting that other plates and reinforcing structures can be used successfully. When the scale frame 16 is a hollow metal extrusion with a square cross section, this structure has the necessary flexibility and allows load cell data cables 24f to be safely and conveniently housed within the frame. Hence, the inventor notes that some flexibility is important in the frame used and an inflexible frame is less desirable.

In the embodiment shown in FIGS. 1A-5, the upper c-channel 16a of the scale frame 16 is affixed to an underside of the bed portion 12c of the bed mold 12 by fasteners 28, shown in the Figures as removable threaded T-nuts mating with threaded shanks, but which could also be threaded bolts, screws, or other suitable variations thereof. The upper side 16a may be flat and fastener apertures (not shown) are formed into the upper side 16a to allow fastening to occur, or alternatively, may be a C-shaped channel and the fasteners 28 are in face threaded T-nut fasteners used with a mateably threaded shank to fasten the bed mold 12 to the scale frame 16. Use of a C-channel allow for some positional adjustment of the bed mold 12 and/or load cell assemblies 24 onto the scale frame 16 and thus allows a single truck scale assembly 100 to be used with many different model pickup trucks 30 and potentially across different truck manufacturers. Additionally, cables 24f and other wiring for the load cell assemblies 24 can be tucked inside the c-channels and thus protected from potential damage. In the embodiment shown in FIGS. 6A-7B, the scale frame 16 is in fact a frame of the truck itself or a truck frame 34, and is not directly affixed to the underside of the bed portion 12c of the bed mold 12 but rather is affixed to the load cell assemblies 24, which are then directly affixed to the underside of the bed portion 12c.

The scale frame 16 is made of a rigid but semi-flexible material such as metal and as mentioned previously is typically a hollow metal extrusion, to allow the individual load cell assemblies 24 in the array to read different values from one another and to accurately weigh unevenly distributed payloads resting in the truck bed. For instance, if a front portion of the truck scale assembly 100 is loaded with bricks, and a back portion is loaded with boxes packed with a varied assortment of contents such as books, clothing, and bedding, the truck scale assembly 100 will output the total weight of the payload, but also sense where the majority of the payload is distributed. It is well known that improper bed loading, particularly unbalanced loading, can lead to dangerous driving conditions, and hence during the loading process, imbalances can be assessed and corrected accordingly.

The array features a plurality of load cell assemblies 24 arranged in spaced apart relationship along either the upper side of the frame of the truck scale assembly 100, as in the embodiment shown in FIGS. 6A-7B, or the lower side of the frame as shown in FIGS. 1A-5. The load cell assemblies 24 shown in the Figures are low profile pancake-style load cells, each with a 500 lb capacity, such as the LCHD-500 model made by Omega Engineering of Norwalk, Conn. In the Figures, the total payload capacity is approximately 3000 lbs. As pickup trucks vary in their maximum payload weight capacity, the total capacity of the load cell assemblies used will of course be increased or decreased across the number of load cell assemblies in the array to reflect the total payload capacity of the specific truck model. In the Figures, the array is comprised of 6 load cell assemblies for a standard 6 or 8 foot long truck bed. For shorter beds, such as a 4 foot bed, the array may consist of four or fewer load cell assemblies positioned in key areas of the bed mold 12, typically at the outermost corners of the approximately rectangular shaped payload support surface or bed portion 12c of the bed mold 12. The pancake style low profile load cell assemblies used in the Figures are comprised of an upper section 24a, and a lower section 24b, shown most clearly in FIG. 3B, where the lower section is relatively thicker than the upper section, and the sections are connected via a heavy duty threaded shaft 24c threadably mated inside a load cell threaded hole 24d. Fine height adjustment of the upper section is achieved by turning the upper section so as to raise or lower the upper section as needed. Each load cell assembly 24 includes a data port 24e and the data cable 24f, to allow payload weight information to be gathered and communicated to the display screen 36, typically an electronic screen using LCD or other common screen technology. The display screen 36 is typically mounted to an exterior of the truck 30, such as shown in FIG. 4A, or alternatively, is part of a built-in or otherwise integral display in the dashboard of the truck 30, or displayed in another convenient location inside or outside the truck. The integral display would ideally be part of the truck's factory-installed diagnostic system, which displays individual tire pressure, vehicle pitch/orientation, etc. The integral display, if part of the factory-installed diagnostic system, could also store and transmit payload data for a variety of reasons, for instance to allow prospective purchasers a way to check on the truck's payload history and scheduling routine maintenance to replace parts.

The inventor notes that in the embodiments shown, the data collected is transmitted to the display screen by way of a cable 24f, as shown in the Figures, however in other embodiments the data can also or alternatively be wirelessly transmitted to the display screen using Bluetooth® or other known wireless technology when the load cell assemblies 24 and the display screens 36 used in those embodiments include such functionality. The inventor also notes that the display screen 36 used in his invention includes a display screen of a mobile device, defined here as a smartphone, tablet, laptop or other mobile electronic device, and includes any handheld electronic device capable of receiving data wirelessly, using Bluetooth® or other wireless technologies, and includes mobile devices designed specifically to only receive and display the payload information as well as those that are multifunctional, useful in those applications where the truck operator prefers the display screen to not be fixed to the outside or inside of the truck, or as an additional display screen for receiving load information from the load cell assemblies.

To include the handheld device designed specifically for a limited use as an additional display screen for the payload information, a corrosion resistant rubberized 3 foot cord is affixed via a magnet or other removable fastener anywhere in the bed for differing vantage points for one or more individuals actively loading the truck bed. The handheld device could also be completely wire free, and ideally magnetic, so that it could be positioned as desired anywhere around the truck exterior. Such capability may be particularly useful when different people are loading and monitoring the payload distribution. For mobile device use, the inventor notes that software would allow the information to be easily stored, transmitted, etc. to other devices, and a vehicle manufacturer such as GM could collect this information, including GPS information, with the truck operator's permission to learn about way in which its branded trucks are used, and allow the truck operator to include other information such as date, location, payload particulars, etc. or simply allow the truck operator to collect this type of data for his or her own personal use and statistical amusement.

The display screen 36 shown in the Figures as being on the exterior of the truck bed assembly could alternatively be removably affixed thereto, which would protect the display screen from weathering or physical damage when otherwise not in use, and having wireless capability for a removable screen is thus an advantageous alternative or supplemental way to receive data from the load cell assemblies. The inventor notes that often wireless reception is spotty or unreliable in remote areas, and thus the functionality of having the data be transmitted via cable is important.

Figure 7A:
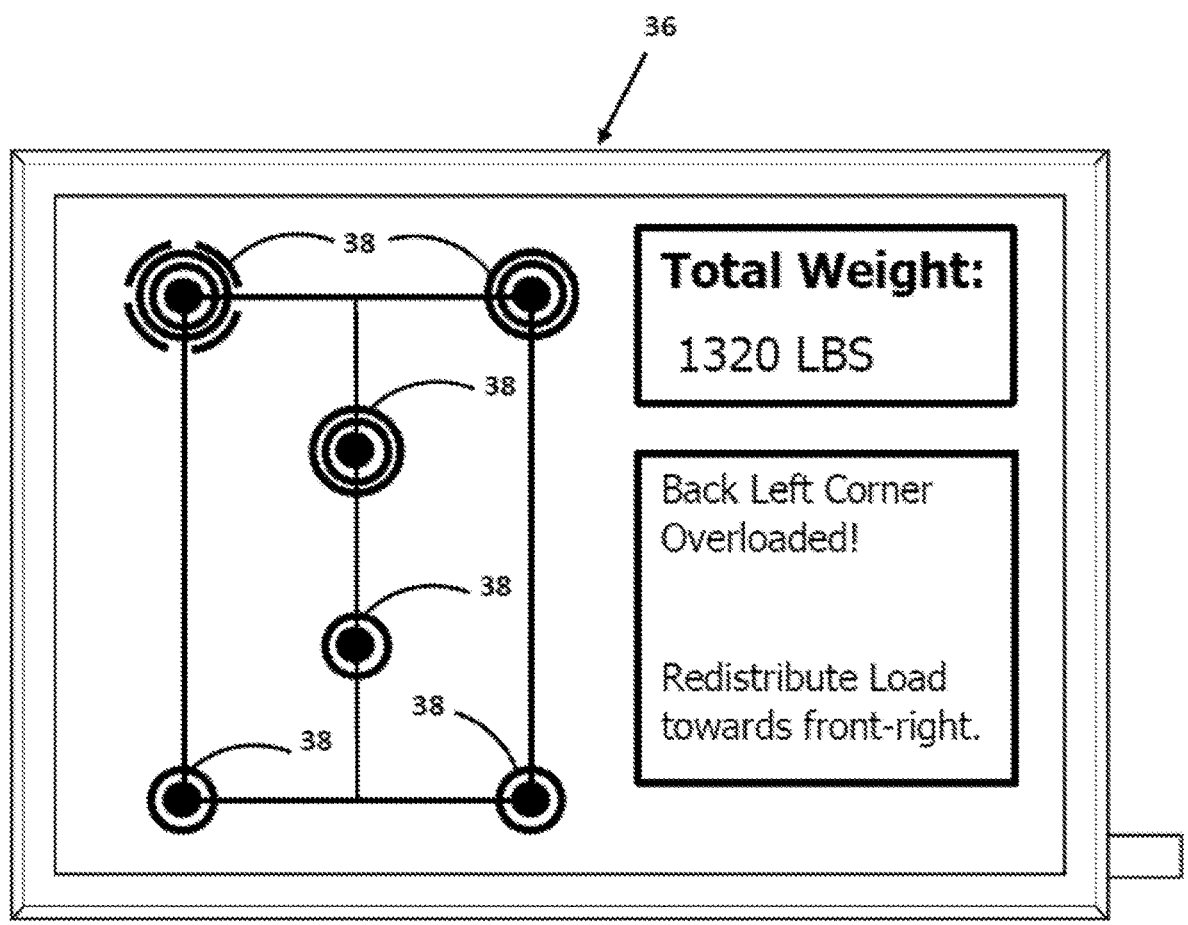
FIG. 7A is a diagrammatic representation of a mounted display screen for displaying weight or load cell matrix for the aftermarket installed truck scale in FIG. 5.
Figure 7B:
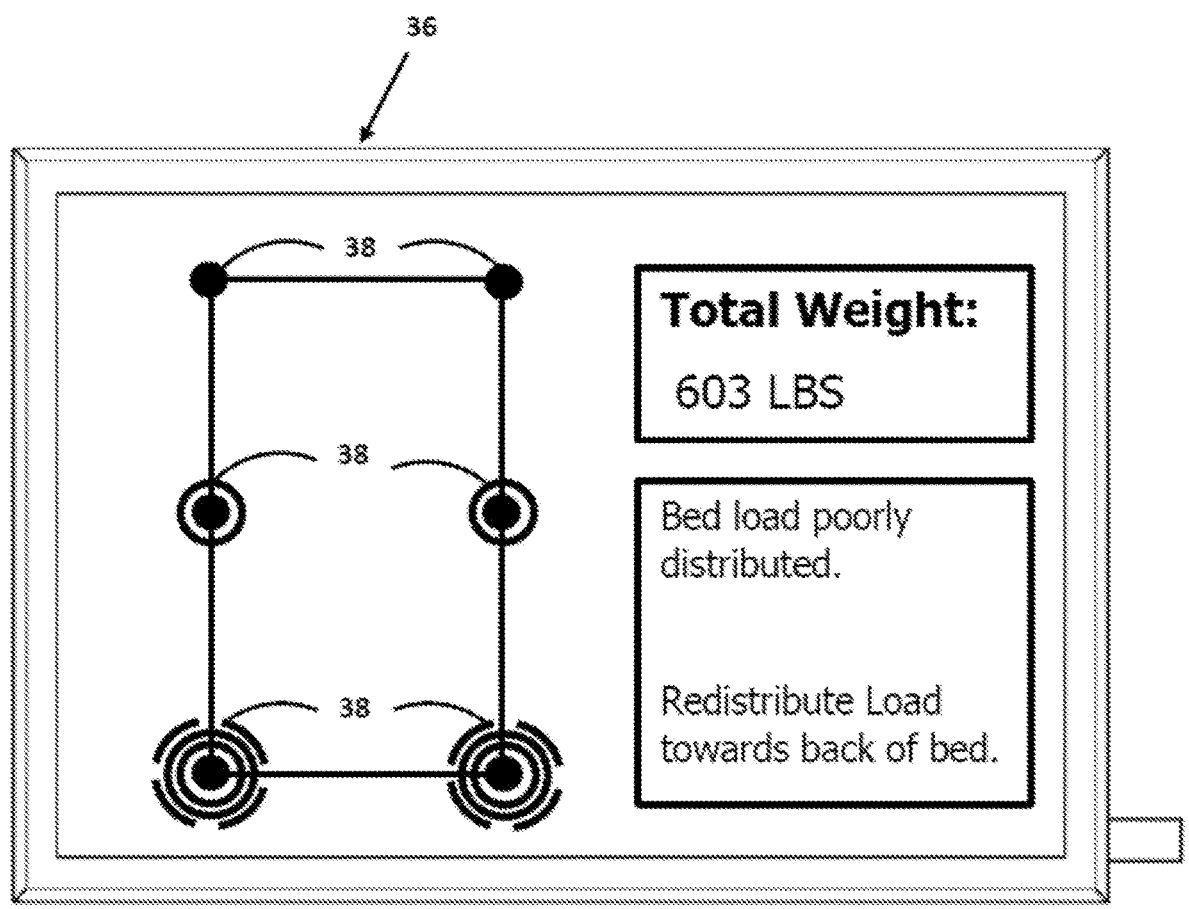
FIG. 7B is a diagrammatic representation of a console screen for displaying weight or load cell matrix used with the factory installed truck scale in FIG. 6A.

The inventor also notes that the payload information from the load cell assemblies, transmitted to the display screen, can be collected and stored over a period of time, and such information can be useful for scheduling routine truck maintenance, as well as be used by contractors to monitor payloads and charge customers according to payload rather than by number of trips or often by just guessing the payload visually. The extra information from the load cell assemblies thus allows the truck owner to better understand and monitor truck service life and anticipate service problems before they arise to decrease downtime. The display screen 36 in FIGS. 7A-B shows the relative locations of the load cell assemblies 24 in the bed mold 12, an overall weight reading, and specific information from each of the load cell assemblies 24 to allow the truck operator to adjust or redistribute the payload, as necessary. The inventor notes that the array shown in the Figures is one example of how six load cell assemblies can be positioned to gather key weight information, however the load cell assemblies are not necessarily required to be located approximately in the four corners of the bed portion 12c, and in fact could be arranged in any desired useful array that can provide useful weight information to the truck operator. For instance, the array could be comprised of five total load cells assemblies positioned in a cross-shaped array through a center of the bed portion, in cases where it is desired to concentrate the payload in the center of the bed, for instance. The inventor is unaware of any scale in the prior art for weighing a truck payload that provides this kind of locational and specific payload information; even the scales at construction supply yards, where trucks are routinely weighed before and after loading, do not provide this kind of information. Again, the truck operators must visually guess as to where the majority of the load is located and make adjustments based on these visual guesses.

In FIGS. 1A-5, the upper section 24a is directly affixed to the scale frame 16 by way of a threaded shaft (in the Figures, shown as a bolt) inserted into a slot formed into the upper section 24a mating with a threaded T-nut slideably positioned in the c-channel 16b. The lower section 24b is affixed to the existing truck bed 32b, typically using bolts and nuts or other threaded fasteners as appropriate. In FIGS. 6A-7B, the upper section 24a of each load cell assembly 24 is directly affixed to the bottom of the bed portion 12c of the bed mold 12, and the lower section 24b directly affixed to the truck frame 34 by bolts or other suitable fasteners.

The load cell assemblies 24 experience a deflection of about 0.076 mm under maximum load, which is relatively small, and a steel hollow scale frame 16 of about 1 inch square tubing is an appropriate mix of strength and rigidity for the maximum load shown in the Figures of 3000 lbs. The inventor notes that the pancake-style load cell assemblies shown in the Figures are by no means the only suitable load cell assemblies that can be used, and that the Figures are not meant to limit his invention to just this type of load cell. Any load cell assembly with an acceptable height profile for the application and the desired load capacity can be substituted, and in fact, it is also possible to mix load cell assemblies with different load capacities, for instance, in certain applications where it may be more beneficial to concentrate the load over certain areas, such as the wheel axles, and have less near the tailgate portion of the truck bed, as an example of a desired unevenly distributed payload. The load cell assemblies 24 and the display screen 36 shown may be powered by wiring into the truck's power source, or alternatively, by a separate battery pack (not shown) that can be housed in a variety of convenient locations about the inside or outside of the truck.

FIGS. 6A-7B show a second embodiment of the truck scale assembly 100, where the scale frame is in fact a same frame as the truck frame 34 as previously discussed, and the bed mold 12 is in fact the truck bed assembly 32. The inventor stresses that this embodiment has the same features as the first embodiment, such as a containment area with a planar bed and vertical side walls for holding the payload, a plurality of load cell assemblies in an array, and a frame. For the embodiment shown in FIGS. 6A-7B, the load cell assemblies 24 are positioned so as to tuck inside the corrugated pattern of the bed 32b for easy installment and negate any redesign of the existing truck bed. Hence the assembly 100 can be used even without a liner, which is sometimes preferred by some truck owners who are concerned with moisture and debris collecting between the liner and the truck bed and thus opt out of installing a liner. The inventor notes that the embodiment shown in FIGS. 1A-5 with the scale frame 16, the load cell assemblies 24 are also tucked into the corrugated pattern of the existing truck bed 32b to minimize height loss and thus volume capacity in the truck bed assembly. As previously mentioned, cables and such can be easily tucked into the hollow frame or c-channels, as well as into the corrugations.

It is to be understood that the above-described arrangements are only illustrative of the application of the principles of the present invention. Numerous modifications and alternative arrangements may be devised by those skilled in the art without departing from the scope of the present invention. For instance, the display screen can also be configured so as to interpret weight data from the load cell assemblies and alternatively or additively provide auditory information to the truck operator. For instance, if one load cell assembly is approaching maximum capacity, that load cell assembly on the display screen will flash, and a beeping sound can be transmitted through a speaker include in the display screen, or as the payload increases, within a certain proximity to the maximum payload capacity, an auditory weight warning could sound through a combined display screen/speaker assembly. This combination would be particularly useful as a second way to alert the truck operator that maximum capacity is fast approaching, to avoid overloading and allow adjustment while loading occurs.

What is claimed is:

1. A truck scale assembly kit, comprising:
   a plastic corrugated scale bed mold having a bed portion and at least one side wall, the side wall having a tapered uppermost edge, the bed portion having an underside;
   a sealing lip having a tapered vertical leg perpendicular to an outwardly extending flange, the flange side and shaped to slideably fit over the uppermost edge of the scale bed mold;
   a scale frame affixed to the underside of the scale bed mold;
   an array of load cell assemblies affixed to the scale frame, wherein the scale frame is sandwiched between the scale bed mold and the array of load cell assemblies; and
   a display screen;
   wherein the plastic corrugated bed mold is sized and shaped to fix inside an existing truck bed assembly;
   wherein the side wall of the plastic corrugated bed mold is in spaced apart relationship with the existing truck bed assembly; and
   wherein the spaced apart relationship is less than 2 inches of space between the side wall and the existing truck bed assembly.

2. The truck scale assembly kit in claim 1, wherein the load cell assemblies in the array and the display screen communicate wirelessly.

3. The truck scale assembly kit in claim 1, further comprising a battery power supply and power cables for at least one of the load cell assemblies and the display screen.

* * * * *